(No Model.)

C. A. PRATT.
CUSHIONED VEHICLE TIRE.

No. 549,016. Patented Oct. 29, 1895.

Witnesses
Arthur F. Randall
C. C. Stecher

Inventor
Charles A. Pratt,
By Arthur W. Crossley,
Atty.

UNITED STATES PATENT OFFICE.

CHARLES A. PRATT, OF CLINTON, MASSACHUSETTS, ASSIGNOR TO THE PNEUMATIC CELLULAR TIRE COMPANY, OF PORTLAND, MAINE.

CUSHIONED VEHICLE-TIRE.

SPECIFICATION forming part of Letters Patent No. 549,016, dated October 29, 1895.

Application filed January 5, 1895. Serial No. 533,987. (No model.)

*To all whom it may concern:*

Be it known that I, CHARLES A. PRATT, of Clinton, in the county of Worcester and State of Massachusetts, have invented certain new and useful Improvements in Cushioned Vehicle-Tires, of which the following is a specification.

This invention has relation to tires for velocipedes and vehicles generally, and has special reference to what are known as "cushioned" tires.

It is the purpose of this invention to provide such improvements in cushioned tires for vehicles as will render the same serviceable and durable to a maximum degree.

It is also the object of the invention to provide improvements in the art of manufacturing cushioned vehicle-tires by which the same may be made more readily and economically than by the processes heretofore employed.

To these ends the invention consists of a cushioned vehicle-tire embodying in its construction a core of cellular or sponge rubber inclosed and compressed to a degree within a case or covering of canvas or other textile fabric, and an outer or body portion of caoutchouc or rubber.

The invention also consists of an improvement in the art of manufacturing cushioned tires of the character mentioned, all as I will now proceed to describe and claim.

Reference is to be had to the annexed drawings, and to the letters marked thereon, forming a part of this specification, the same letters designating the same parts or features, as the case may be, wherever they occur.

Figure 1:
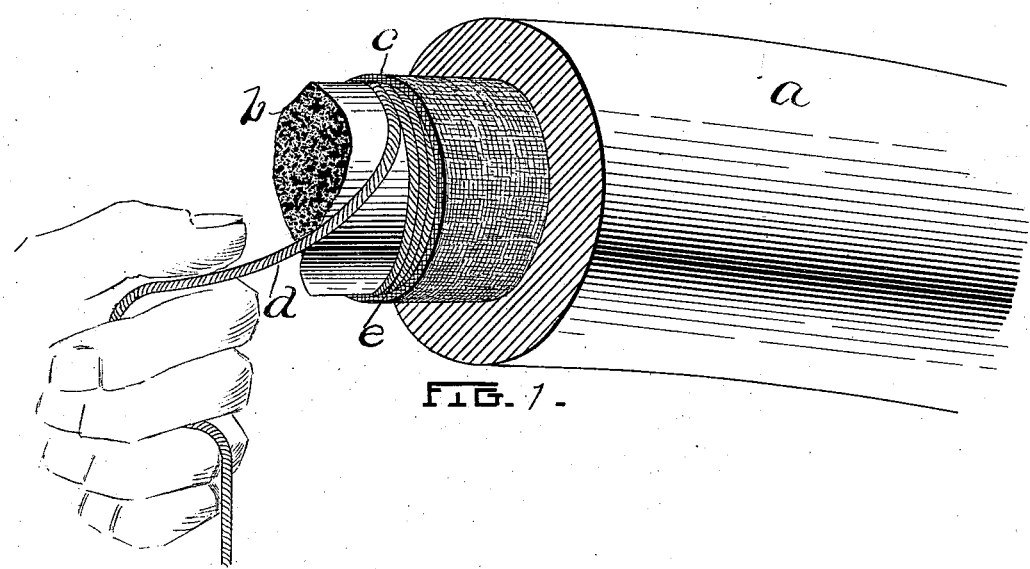
Figure 2:
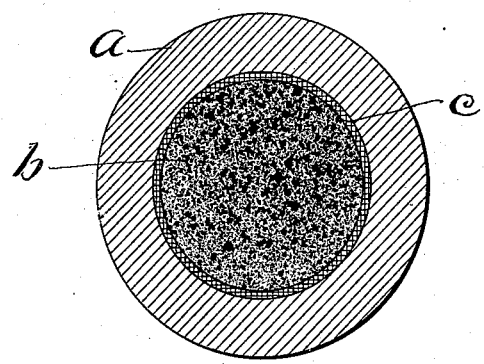

Of the drawings, Figure 1 is a perspective view of a portion of a cushioned vehicle-tire embodying my invention and showing my improved method of making the same. Fig. 2 is a cross-sectional view showing the structural characteristics of my improved cushioned vehicle-tire.

In the drawings, $a$ designates the outer portion of the tire, which may be composed of relatively-hard caoutchouc or rubber vulcanized to the desired degree.

$b$ is the core or body portion of the tire, and is preferably composed of cellular or sponge rubber which is compressed within its natural bounds to a degree which will render the tire sufficiently firm and yet elastic to suit the service to which it is proposed to subject it. The compressed cellular rubber core is confined within a tubular canvas or other textile casing or covering $c$, which is smaller in diameter than the diameter of the sponge-rubber core when in its normal unconfined condition, and as thus constituted the core is introduced in any suitable way into the tubular outer portion $a$.

An important feature of my invention resides in the fact that the core or body portion of my improved tire is composed of constricted or compressed cellular or sponge rubber, which condition is necessary to secure its perfect operation in a tire. I have ascertained that where cellular rubber is employed in its normal unconstricted state it fails to fully perfectly subserve the purpose of a cushion-tire body portion or core, in that it not only is too soft and yielding, but its resilient or elastic properties are too sluggish and slow in their operation, so that cellular rubber under constriction or compression, as herein described, is possessed of different structural characteristics, so far as the present invention goes, from the same substance in its normal state.

There are various methods by which the compressed cellular rubber core $b$ may be introduced into its casing or covering. One mode practiced by me, and which I have found entirely efficient, is to first form the casing or covering of proper size and then wind the cellular rubber core with a cord $d$, laying the coils $e$ as close as may be necessary, and compressing the core appreciably beyond the bounds it will assume when released in the casing or covering. With the core so prepared it is introduced into its casing or covering, and then by taking hold of the end of the cord and pulling upon the same, as illustrated in Fig. 1, it may be drawn off and the core released to expand to the extent allowed by the covering or casing, as shown in Fig. 2, and as the tubular casing is smaller in diameter than the diameter of the sponge rubber when unconfined, the said rubber is thus held in a constricted or compressed condition. I am not confined, however, to this process in the manufacture of my improved tire, as the casing may be formed around the core while the latter is under compression, or it may be made in any other suitable way, the principal feature of the invention being the core of cellular rubber inclosed under compression within a casing or covering.

Having thus explained the nature of the invention and described a way of constructing and using the same, though without attempting to set forth all of the forms in which it may be made or all of the modes of its use, it is declared that what is claimed is—

1. A cushioned vehicle tire comprising in its construction a tubular outer portion of hard rubber, a core or body portion of cellular or sponge rubber, and a tubular casing of canvas or other textile fabric for inclosing said core within the outer portion, said casing being smaller in diameter than the diameter of the sponge rubber core when the latter is in an unconfined and normal condition, whereby said core is constricted and held under compression, substantially as set forth.

2. The improvement in the art of forming cores for cushioned vehicle tires which consists in making a suitable casing or covering; then winding the core with a cord and compressing it appreciably within its natural bounds; then introducing the core so wound and compressed into a casing or covering, and finally drawing or pulling off the cord leaving the core to expand within the casing or covering.

In testimony whereof I have signed my name to this specification, in the presence of two subscribing witnesses, this 3d day of November, A. D. 1894.

CHARLES A. PRATT.

Witnesses:
ARTHUR W. CROSSLEY,
C. C. STECHER.